(12) United States Patent
Momose et al.

(10) Patent No.: US 12,263,555 B2
(45) Date of Patent: *Apr. 1, 2025

(54) GLASS ARTICLE AND METHOD OF PRODUCING GLASS ARTICLE

(71) Applicant: AGC Inc., Tokyo (JP)

(72) Inventors: Toru Momose, Tokyo (JP); Osamu Sato, Shizuoka (JP); Hirofumi Yamamoto, Shizuoka (JP); Nobuhiko Takeshita, Tokyo (JP)

(73) Assignee: AGC INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/616,813

(22) Filed: Mar. 26, 2024

(65) Prior Publication Data

US 2024/0227117 A1 Jul. 11, 2024

Related U.S. Application Data

(63) Continuation of application No. 17/969,012, filed on Oct. 19, 2022, now Pat. No. 11,969,857, which is a continuation of application No. PCT/JP2021/007736, filed on Mar. 1, 2021.

(30) Foreign Application Priority Data

Apr. 23, 2020 (JP) ................................. 2020-076645

(51) Int. Cl.
*B24B 37/08* (2012.01)
*B24B 37/28* (2012.01)

(52) U.S. Cl.
CPC .............. *B24B 37/08* (2013.01); *B24B 37/28* (2013.01)

(58) Field of Classification Search
CPC ................................ B24B 37/08; B24B 37/28
See application file for complete search history.

(56) References Cited

U.S. PATENT DOCUMENTS

2019/0160627 A1* 5/2019 Mikuriya ................ B24B 49/00
2020/0101577 A1 4/2020 Kim et al.

FOREIGN PATENT DOCUMENTS

| CN | 107073680 A | 8/2017 |
|----|-------------|--------|
| CN | 110962039 A | 4/2020 |
| JP | 2014-116590 A | 6/2014 |

(Continued)

OTHER PUBLICATIONS

International Searching Authority, "International Search Report," issued in connection with International Patent Application No. PCT/JP2021/007736, dated May 11, 2021.

(Continued)

*Primary Examiner* — Elizabeth E Mulvaney
(74) *Attorney, Agent, or Firm* — Foley & Lardner LLP

(57) ABSTRACT

A method of producing a glass article includes holding a carrier having a circular shape, in which a glass substrate having a circular shape is retained, with an upper surface plate and a lower surface plate; and polishing the glass substrate by rotating the carrier with respect to the upper surface plate and the lower surface plate, to obtain the glass article. The glass substrate is disposed in the carrier such that, in a top plan view, a center of the carrier is included in a region of the glass substrate, and a center of the glass substrate is shifted from the center of the carrier.

6 Claims, 13 Drawing Sheets

(56) References Cited

FOREIGN PATENT DOCUMENTS

| | | |
|---|---|---|
| JP | 2014-138973 A | 7/2014 |
| JP | 2019-115952 A | 7/2019 |

OTHER PUBLICATIONS

International Searching Authority, "Written Opinion," issued in connection with International Patent Application No. PCT/JP2021/007736, dated May 11, 2021.

\* cited by examiner

GLASS ARTICLE AND METHOD OF PRODUCING GLASS ARTICLE

CROSS-REFERENCE TO RELATED APPLICATION

The present application is a Continuation of U.S. patent application Ser. No. 17/969,012, filed on Oct. 19, 2022, which is a Bypass Continuation of International Application No. PCT/JP2021/007736, filed Mar. 1, 2021, which claims priority to Japanese Patent Application No. 2020-076645 filed Apr. 23, 2020. The contents of these applications are incorporated herein by reference in their entirety.

BACKGROUND OF THE INVENTION

1. Field of the Invention

The present invention relates to a glass article and a method of producing the glass article.

2. Description of the Related Art

For example, glass articles that are as thin as 0.1 mm thick are widely used in various fields. Such a thin glass article can be produced by polishing both sides of a glass substrate with a double side polishing apparatus (See, for example, Japanese Unexamined Patent Application Publication No. 2014-138973).

SUMMARY OF THE INVENTION

Problem to be Solved by the Invention

There is a problem that thin glass articles are relatively difficult to handle. For example, a thin glass article may sag or warp during conveyance. In the case of noticeable deformation, a crack may occur.

The present invention has been made in view of the above-described problem, and has an object to provide a glass article that is relatively easy to handle and in which warping and sagging can be suppressed significantly. The present invention also has an object to provide a method of producing the glass article.

Means for Solving the Problem

According to the present disclosure, a glass article having a first surface having a circular shape,
a radius R of the glass article being within a range of from 50 mm to 150 mm inclusive,
when, in the glass article, to is a thickness at a center Og, a first end is one end portion, t1 is a thickness at the first end, tx' is a thickness at any position X (except the first end and the center Og) between the first end and the center Og, and
a thickness is measured from a first-surface side of the glass article by an optical interferometry type thickness measurement method, conditions of (a) $0.1\ \text{mm} < to < 2\ \text{mm}$      expression (1), (b1) $1 < to/t1 \le 1.1$      expression (2), (c1) $to > tx' > t1$      expression (3), and (d1) $tx_n \ge (to-t1) \times (n/5) + t1$      expression (4)

(where n is any integer from 1 to 5, and $tx_n$ represents a thickness at a position $X_n$ of $R \times (n/5)$ from the first end toward the center Og)
being satisfied, and
when a second end is an end portion opposite to the first end with respect to the center Og, t2 is a thickness at the second end, tx" is a thickness at any position W (except the second end and the center Og) between the second end and the center Og, and
a thickness is measured from a first-surface side of the glass article by the optical interferometry type thickness measurement method, conditions of (b2) $1 < to/t2 \le 1.1$      expression (5), (c2) $to > tx'' > t2$      expression (6), and (d2) $tw_n \ge (to-t2) \times (n/5) + t2$      expression (7)

(where n is any integer from 1 to 5, and $tw_n$ represents a thickness at a position $W_n$ of $R \times (n/5)$ from the second end toward the center Og)
being satisfied, is provided.

According to the present disclosure, a method of producing a glass article, including
a step of holding a carrier having a circular shape, in which a glass substrate having a circular shape is retained, with an upper surface plate and a lower surface plate, and polishing the glass substrate by rotating the carrier with respect to the upper surface plate and the lower surface plate, to obtain the glass article,
the glass substrate being disposed in the carrier, such that, in a top plan view,
a center Oc of the carrier is included in a region of the glass substrate, and
a center Og of the glass substrate is shifted from the center Oc of the carrier, is provided.

Effects of the Invention

According to the present invention, a glass article that is relatively easy to handle and in which warping and sagging can be suppressed significantly can be provided. According to the present invention, also a method of producing such a glass article can be provided.

BRIEF DESCRIPTION OF DRAWINGS

Other objects and further features of the present disclosure will be apparent from the following detailed description when read in conjunction with the accompanying drawings, in which.

DESCRIPTION OF THE PREFERRED EMBODIMENT

Figure 1:
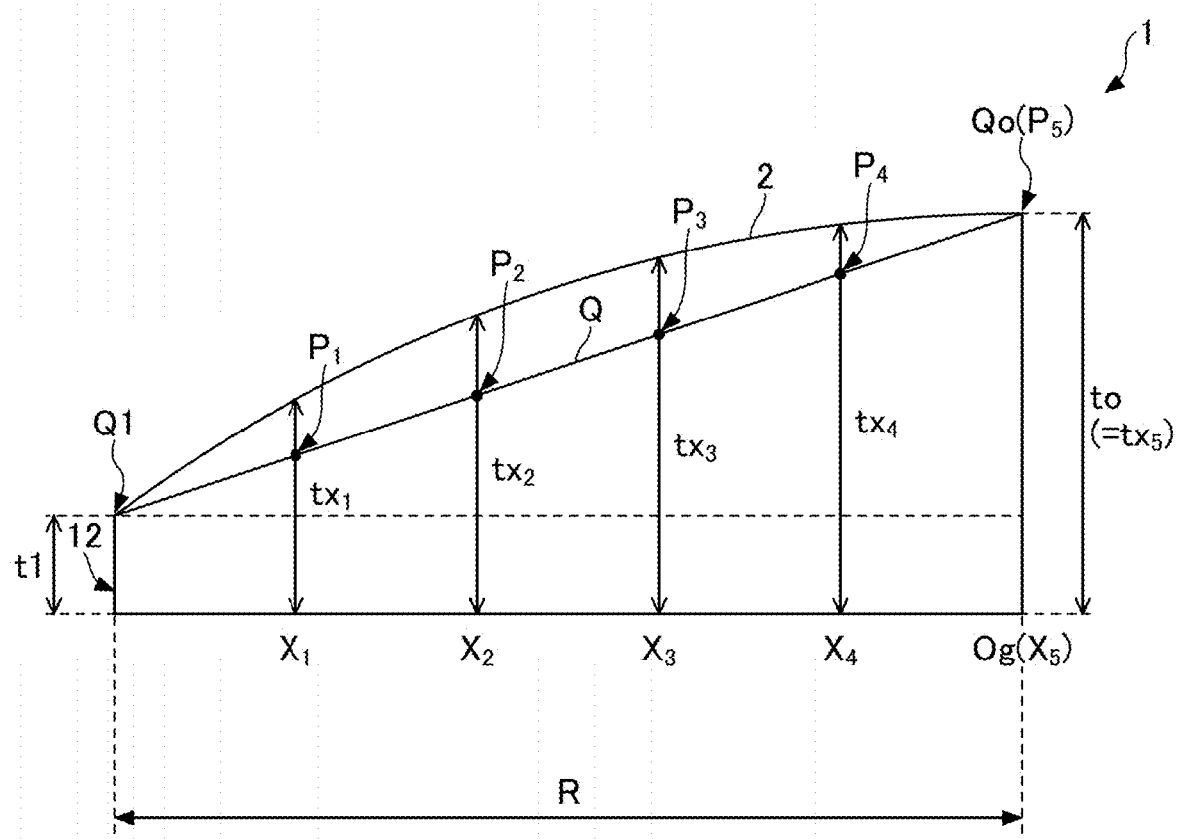
FIG. 1 is a diagram schematically illustrating one feature in a glass article according to the embodiment of the present invention.

Hereinafter, one embodiment of the present invention will be described.

As described above, there is a problem that thin glass articles may sag/droop or warp during conveyance, and in the case of noticeable deformation a crack may occur.

In contrast, according to the embodiment of the present invention, a glass article having a first surface having a circular shape, a radius R of the glass article being within a range of from 50 mm to 150 mm inclusive, when, in the glass article, to is a thickness at a center Og, a first end is one end portion, t1 is a thickness at the first end, tx' is a thickness at any position X (except the first end and the center Og) between the first end and the center Og, and a thickness is measured from a first-surface side of the glass article by an optical interferometry type thickness measurement method, conditions of (a) $0.1 \text{ mm} < t < 2 \text{ mm}$ \hfill expression (1), (b1) $1 < to/t1 \leq 1.1$ \hfill expression (2), (c1) $to > tx' > t1$ \hfill expression (3), and (d1) $tx_n \geq (to-t1) \times (n/5) + t1$ \hfill expression (4)

(where n is any integer from 1 to 5, and $tx_n$ represents a thickness at a position $X_n$ of $R \times (n/5)$ from the first end toward the center Og) being satisfied, and when a second end is an end portion opposite to the first end with respect to the center Og, t2 is a thickness at the second end, tx" is a thickness at any position W (except the second end and the center Og) between the second end and the center Og, and a thickness is measured from a first-surface side of the glass article by the optical interferometry type thickness measurement method, conditions of (b2) $1 < to/t2 \leq 1.1$ \hfill expression (5), (c2) $to > tx'' > t2$ \hfill expression (6), and (d2) $tw_n \geq (to-t2) \times (n/5) + t2$ \hfill expression (7)

(where n is any integer from 1 to 5, and $tw_n$ represents a thickness at a position $W_n$ of $R \times (n/5)$ from the second end toward the center Og) being satisfied, is provided.

In the present disclosure, a "glass article" means an article obtained by polishing a glass substrate. Accordingly, the glass substrate is used as a polished material to manufacture the glass article.

In this application, an "optical interferometry type thickness measurement method" means a method of measuring a thickness distribution of an object to be measured according to a difference between a phase of a reflected light from a front surface and a phase of a reflected light from a rear surface. Measurement apparatuses of such measurement method include, for example, an optical interferometry type thickness measurement apparatus (FlatMaster 200, by Corning Tropel Corporation).

Here, the above-described condition (c1) indicates that in a cross-section passing through the center Og of the glass article, the thickness of the glass article is between the thickness t1 at the first end and the thickness to at the center Og, ranging from one end portion (i.e., the first end) to the center Og. Similarly, the condition (c2) indicates that in the cross-section, the thickness of the glass article is between the thickness t2 at the second end and the thickness to at the center Og, ranging from the other end portion (i.e., the second end) to the center Og.

The condition (d1) and the condition (d2) indicate that the glass article has a profile, in which in the cross-section the thickness of the glass article monotonically decreases from the center toward each of the end portions.

Hereinafter, the condition (d1) will be described in more detail with reference to FIG. 1.

FIG. 1 is a diagram schematically depicting a half of the cross-section passing through the center Og in a glass article having a top surface having a circular shape.

As shown in FIG. 1, the glass article 1 has the top surface 2 and has a radius R. The glass article 1 also has the thickness to at the center Og and the thickness t1 at the end portion 12. FIG. 1 schematically shows the profile of the top surface from the end portion 12 to the center Og of the glass article 1.

As shown in FIG. 1, the radius R is divided into five equal portions from the end portion 12 towards the center Og, the positions are indicated by $X_1$ to $X_5$. The position $X_5$ corresponds to the center Og.

The thickness of the glass article 1 at each position $X_n$, where n is an integer from 1 to 5, will be denoted by $tx_n$. Note that the thickness $tx_5$=to at the position $X_5$ when n=5.

From the point Q1 on the top surface 2 at the end portion 12, a straight-line Q is drawn passing through the position Qo on the top surface 2 at the center Og. An intersection of a vertical line at each position $X_n$ and the line Q will be denoted by $P_n$. For example, the intersection of the vertical line at the position $X_1$ and the line Q will be denoted by Pd1, and the intersection of the vertical line at the position $X_2$ and the line Q will be denoted by $P_2$, and so on. The point $P_5$ is the position Qo.

Here, a height of the point $P_n$ at each position $X_n$ is expressed by $(to-t1) \times (n/5)+t1$. The height of the point $P_n$ indicates the right-hand side in the above-described condition (d1). Accordingly, the condition (d1) means that the thickness $tx_n$ of the glass article 1 is greater than or equal to the height of the point $P_n$ at each position $X_n$ obtained by dividing the radius R by 5 equally from the end portion 12 towards the center Og.

Accordingly, when the glass article 1 satisfies the condition (d1), the top surface 2 of the glass article 1 can be regarded as having a profile that the thickness monotonically decreases from the center toward the end portion 12.

Strictly speaking, even when the condition (d1) is satisfied, there may be a region in which the thickness does not change monotonically between the position $X_{n-1}$ and the position $X_n$. In such a case, the top surface 2 may have a profile that is not quite a monotonically decreasing profile. However, according to the inventors of the present disclosure, in the case of a glass article 1 having a radius R within a range of from 50 mm to 150 mm inclusive, it is empirically recognized that a top surface 2 is likely to have a profile with monotonically decreasing thickness, provided the condition (d1) is satisfied with n=5.

Accordingly, when the glass article 1 satisfies the condition (d1), the top surface 2 of the glass article 1 can be regarded as having a profile in which the thickness at the center is the greatest and the thickness monotonically decreases from the center toward the end portion 12 (first end).

Also, although not shown in FIG. 1, the same feature can be said from the condition (d2) for the profile of the top surface from the second end to the center Og.

Hereinafter, a profile satisfying the conditions (b1) to (d1) and the conditions (b2) to (d2) in the cross-section passing through the center Og of the glass article (hereinafter referred to as a "maximum cross-section") will be specifically referred to as a "specific convex profile."

The above-described conditions (b1) to (d1) and the conditions (b2) to (d2) merely define a profile of the first surface in one "maximum cross-section." That is, the above-described conditions do not provide information on a profile of the first surface in the other maximum cross-section.

However, according to the inventors of the present disclosure, it is empirically recognized that for the glass article produced by polishing using a double side polishing apparatus, when one maximum cross-section satisfies the above-described conditions (b1) to (d1) and the conditions (B2) to (d2), also in the other maximum cross-sections the conditions (b1) to (d1) and the conditions (b2) to (d2) are often satisfied.

That is, as long as the conditions (b1) to (d1) and (b2) to (d2) are satisfied in one maximum cross-section, the glass article can be regarded as being likely to have a "specific convex profile" in any maximum cross-section. Hereinafter, a surface having a "specific convex profile" in all the maximum cross-sections will be also referred to as an "ideal convex surface."

Thus, in the glass article according to the embodiment of the present invention, the first surface has a specific convex profile. In the glass article, for example, by supporting the glass article at around the center of the glass article from the opposite side of the first surface, it is possible to suppress significantly an occurrence of warping or sagging in the glass article.

Accordingly, the glass article according to the embodiment of the present invention can be handled relatively easily even when the glass article is relatively thin in thickness.

Also, in the glass article according to the embodiment of the present invention, by the effect of the first surface having the specific convex profile, it is possible to easily reduce the risk of occurrence of a stain or an unevenness caused by a cleaning liquid during or after the cleaning process for the glass article.

Also, if both surfaces of the glass article are flat, when a plurality of sheets of the glass articles are laminated, the glass articles may adhere tightly to each other and may be difficult to be separated from each other. In addition, when an inclusion, such as a spacer, is interposed between the glass articles during lamination to avoid such adhesion between the glass articles, the risk that a component of the inclusion adheres to the glass article increases.

However, in the glass article according to the embodiment of the present invention, even when a plurality of sheets of the glass articles are laminated, the adhesion tightness of the glass articles to each other is reduced, so that it is easy to separate the glass article one by one without the use of an inclusion.

Alternatively, for example, when a flat glass article is chucked to various apparatuses by a vacuum adsorption method or the like, both end portions of the glass article may be pulled and the central portion may be concavely deformed. However, the glass article according to the embodiment of the present invention has a first surface having a specific convex profile and has a thick central portion in advance. Thus, in the glass article according to the embodiment of the present invention, the flatness in the chuck state can be significantly enhanced.

Moreover, the glass articles according to the embodiment of the present invention have an advantage of, for example, facilitating release of a transferred resin from an imprint mold after transferring of a nanoimprinting process.

In the glass article according to the embodiment of the present invention, when a third end is a position rotated 90° from the first end around the center Og as a center, t3 is a thickness at the third end, ty' is a thickness at any position Y (except the third end and the center Og) between the third end and the center Og, and a thickness is measured from a first-surface side by the optical interferometry type thickness measurement method, conditions of (e1)  $1 < to/t3 \le 1.1$     expression (8), (f1)  $to > ty' > t3$     expression (9), and (g1)  $ty_n \ge (to-t3) \times (n/5)+t3$     expression (10)

(where n is any integer from 1 to 5, and $ty_n$ represents a thickness at a position $Y_n$ of $R \times (n/5)$ from the third end toward the center Og) are preferably satisfied.

Further, in the glass article according to the embodiment of the present invention, when a fourth end is an end portion opposite to the third end with respect to the center Og, t4 is a thickness at the fourth end, ty" is a thickness at any position V (except the fourth end and the center Og) between the fourth end and the center Og, and a thickness is measured from a first-surface side by the optical interferometry type thickness measurement method, conditions of (e2)  $1 < to/t4 \le 1.1$     expression (11), (f2) $to > ty'' > t4$     expression (12), and (g2) $tv_n \geq (to-t4) \times (n/5) + t4$     expression (13)

(where n is any integer from 1 to 5, and $tv_n$ represents a thickness at a position $V_n$ of $R \times (n/5)$ from the fourth end toward the center Og)
are preferably satisfied.

In such a glass article, a first surface having a specific convex profile can be obtained even in the maximum cross-section passing through the third end located at the position 90° rotated from the first end around the center Og as a rotation axis.

Thus, in this case, the first surface in the glass article can be made closer to the "ideal convex surface".

(Glass Article According to the Embodiment of the Present Invention)

Hereinafter, the glass article according to the embodiment of the present invention will be described in more detail with reference to FIG. 2.

Figure 2:
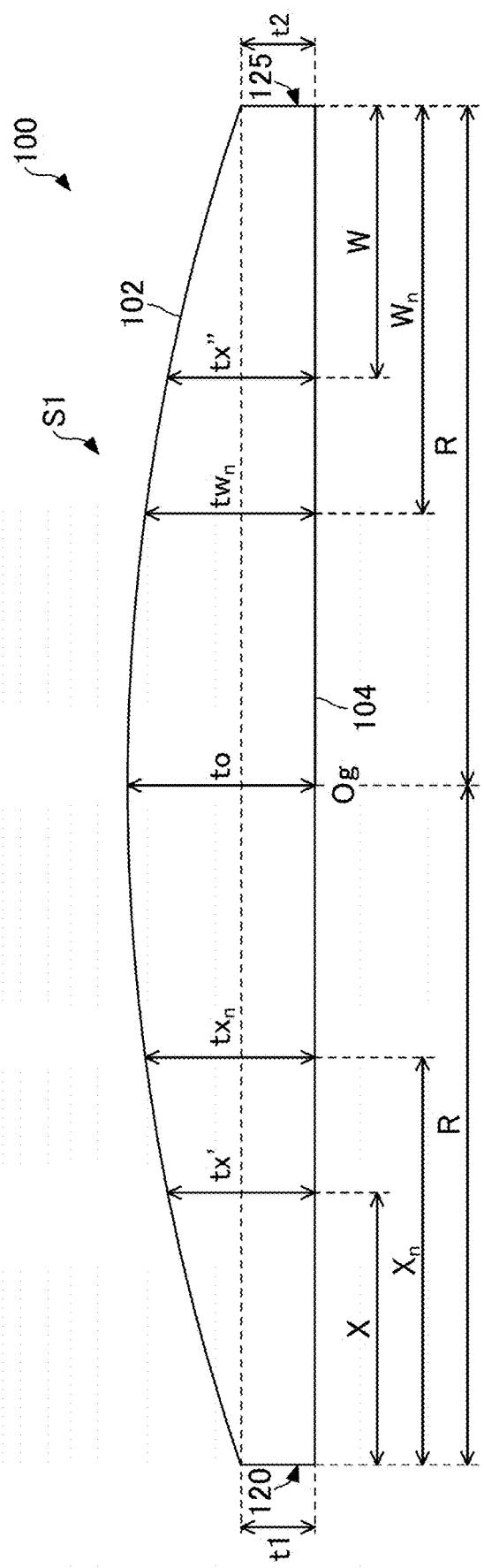
FIG. 2 is a diagram schematically depicting an example of a cross-section of the glass article according to the embodiment of the present invention.

FIG. 2 schematically shows a form of a cross-section of the glass article according to the embodiment of the present invention. FIG. 2 shows a cross-section passing through a center Og of the glass article, that is, the "maximum cross-section." Hereinafter, the maximum cross-section shown in FIG. 2 will be referred to as "the first maximum cross-section S1."

As shown in FIG. 2, a glass article 100 (hereinafter referred to as a "first glass article") according to the embodiment of the present invention has a first surface 102 and a second surface 104. Although not apparent from FIG. 2, the first surface 102 and the first glass article 100 have a generally circular shape, in a top plan view. The first glass article 100 also has a first end 120 and a second end 125 at symmetric positions with respect to the center Og.

Here, the first glass article 100 satisfies the aforementioned conditions (a) to (d1) and (b2) to (d2).

That is, the first glass article 100 has a thickness to at the center Og, where to is greater than 0.1 mm and less than 2 mm. The thickness to is preferably within the range of from 0.2 mm to 1.1 mm inclusive.

The first glass article 100 also satisfies $1 < to/t1 \leq 1.1$ where a thickness at the first end 120 is t1. It is preferable that to/t1 be less than or equal to 1.05.

The first glass article 100 also satisfies $to > tx' > t1$ where a thickness at any position X (except the first end 120 and the center Og) between the first end 120 and the center Og is tx'.

When a thickness at a position $X_n$ of $R \times (n/5)$ from the first end 120 toward the center Og in the first glass article 100 is $tx_n$, $tx_n \geq (to-t1) \times (n/5) + t1$     expression (4)

is satisfied, where n is any integer from 1 to 5.

Furthermore, the first glass article 100 satisfies $1 < to/t2 \leq 1.1$, where a thickness at the second end 125 is t2. It is preferable that to/t2 be less than or equal to 1.05.

Also, the first glass article 100 satisfies $to > tx'' > t2$, when a thickness at any position W (except the second end 125 and the center Og) between the second end 125 and the center Og is tx''.

When a thickness at a position $W_n$ of $R \times (n/5)$ from the second end 125 toward the center Og in the first glass article 100 is $tw_n$, $tw_n \geq (to-t2) \times (n/5) + t2$     expression (7)

is satisfied, where n is any integer from 1 to 5.

In this manner, the first surface 102 of the first glass article 100 has a "specific convex profile" in the first maximum cross-section S1 passing through the first end 120 and the second end 125.

Accordingly, in the first glass article 100, warping or sagging that may occur to the glass article during handling can be significantly reduced. Thus, the first glass article 100 can be handled relatively easily.

Here, the first glass article 100 may further satisfy the conditions (e1) to (g1) and (e2) to (g2).

Hereinafter, these features will be described with reference to FIG. 3.

Figure 3:
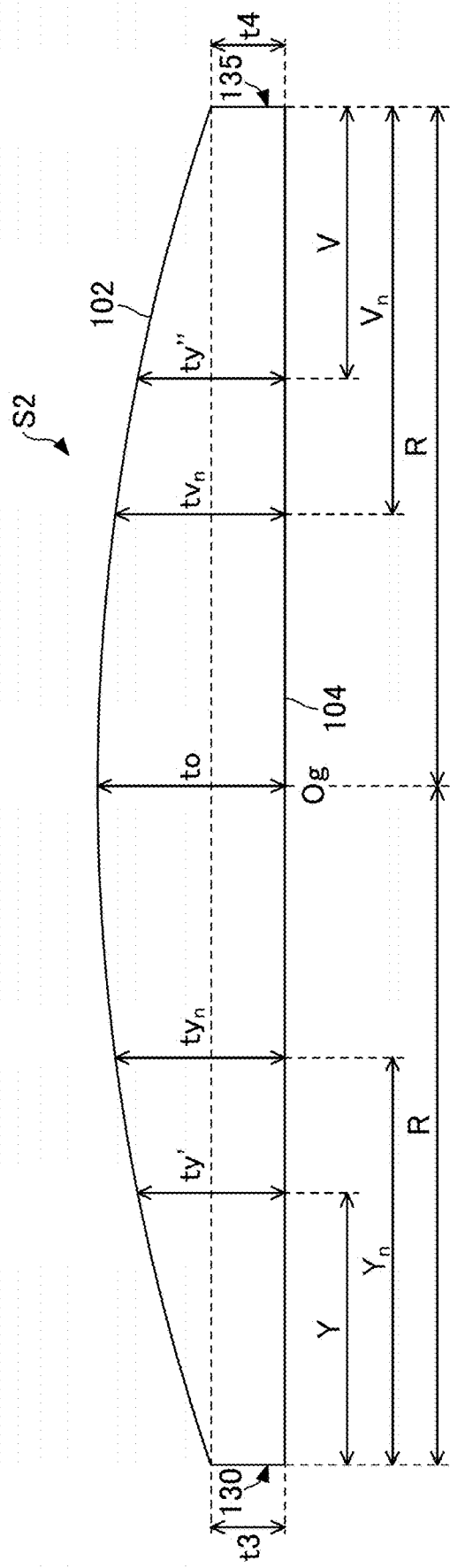
FIG. 3 is a diagram schematically depicting an example of another cross-section of the glass article according to the embodiment of the present invention.

FIG. 3 schematically shows another form of a maximum cross-section of the first glass article 100. FIG. 3 shows a maximum cross-section obtained by rotating 90° from the position of the first maximum cross-section S1 shown in FIG. 2, around the center Og as a central axis (hereinafter referred to as a "second maximum cross-section").

As shown in FIG. 3, the second maximum cross-section S2 has a third end 130 and a fourth end 135 at symmetric positions with respect to the center Og.

The first glass article 100 satisfies $1 < to/t3 \leq 1.1$ where a thickness at the third end 130 is t3. It is preferable that to/t3 be less than or equal to 1.05.

The first glass article 100 also satisfies $to > ty' > t3$ where a thickness at any position Y between the third end 130 and the center Og (except the third end 130 and the center Og) is ty'.

When a thickness at a position $Y_n$ of $R \times (n/5)$ from the third end 130 toward the center Og in the first glass article 100 is $ty_n$, $ty_n \geq (to-t3) \times (n/5) + t3$     expression (10)

is satisfied, where n is any integer from 1 to 5.

Furthermore, the first glass article 100 satisfies $1 < to/t4 \leq 1.1$, where a thickness at the fourth end 135 is t4. It is preferable that to/t4 be less than or equal to 1.05.

The first glass article 100 also satisfies $to > ty'' > t4$, when a thickness at any position W between the fourth end 135 and the center Og (except the fourth end 135 and the center Og) is ty''.

When a thickness at a position $W_n$ of $R \times (n/5)$ from the fourth end 135 toward the center Og in the first glass article 100 is $tv_n$, $tv_n \geq (to-t4) \times (n/5) + t4$     expression (13)

is satisfied, where n is any integer from 1 to 5.

In this manner, the first surface 102 of the first glass article 100 may also have a "specific convex profile" in the second maximum cross-section S2 passing through the third end 130 and the fourth end 135.

In this case, the first surface 102 can be made closer to the "ideal convex surface" in the first glass article 100.

(Other Features of the Glass Article According to the Embodiment of the Present Invention)

Next, other features of the glass article according to the embodiment of the present invention will be described.

The glass article according to the embodiment of the present invention may be made of any glass. The glass articles according to the embodiment of the present invention may be made of, for example, soda lime glass, borosilicate glass, or alkali-free glass.

The glass may be chemically tempered or may be physically tempered.

The glass for the glass article preferably has a refractive index of 1.6 or more, more preferably 1.7 or more, and even more preferably 1.8 or more.

In addition, the glass for the glass article preferably has a surface roughness (Ra) of 1 nm or less, and more preferably 0.5 nm or less.

The glass article according to the embodiment of the present invention has a circular shape, in a top plan view, having a radius R within a range of from 50 mm to 150 mm inclusive. The radius R is preferably within a range of from 75 mm to 150 mm inclusive.

In the example shown in FIGS. 2 and 3, the second surface 104 of the first glass article 100 is substantially flat.

However, this is merely an example, and in the glass article according to the embodiment of the present invention, the form of the second surface 104 is not particularly limited. For example, the second surface 104 may have a "specific convex profile" in at least one of the maximum cross-sections, in the same manner as the first surface 102. In particular, the second surface 104 may be an "ideal convex surface".

(Method of Producing Glass Article According to the Embodiment of the Present Invention)

Next, an example of a method of producing the glass article according to one embodiment of the present invention will be described with reference to FIGS. 4 to 7.

Figure 4:
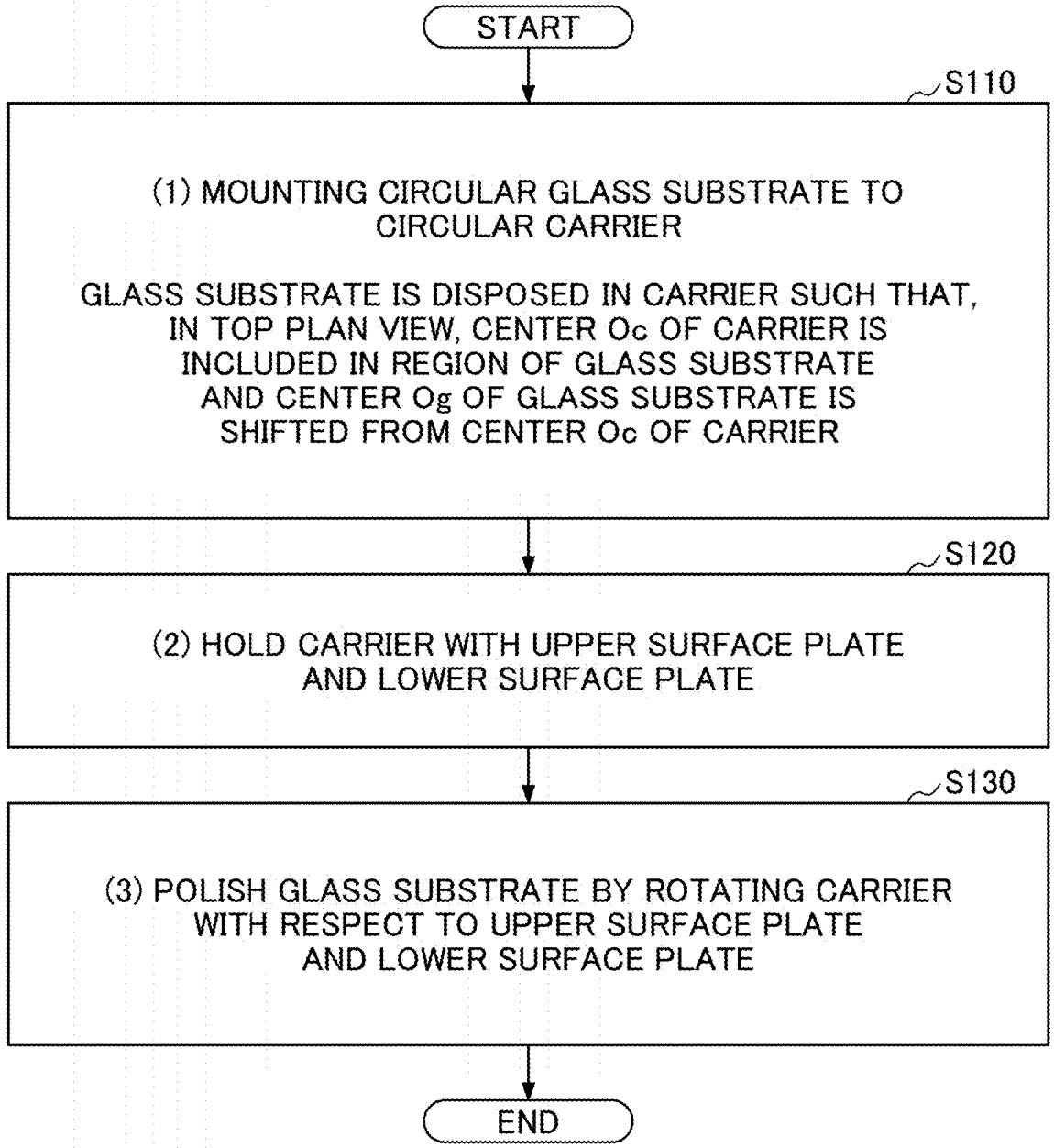
FIG. 4 is a diagram schematically depicting an example of a flow of a method of producing a glass article according to the embodiment of the present invention.

FIG. 4 schematically shows a flow of the method of producing the glass article (hereinafter referred to as a "first producing method") according to the embodiment of the present invention.

As shown in FIG. 4, the first producing method includes:
(1) a step of disposing a glass substrate having a circular shape in a carrier having a circular shape, the glass substrate being disposed in the carrier such that a center Oc of the carrier is included in a region of the glass substrate, and a center Og of the glass substrate being shifted from the center Oc of the carrier (step S110);
(2) a step of holding the carrier with an upper surface plate and a lower surface plate (step S120); and
(3) a step of polishing the glass substrate by rotating the carrier with respect to the upper surface plate and the lower surface plate (step S130).

Figure 5:
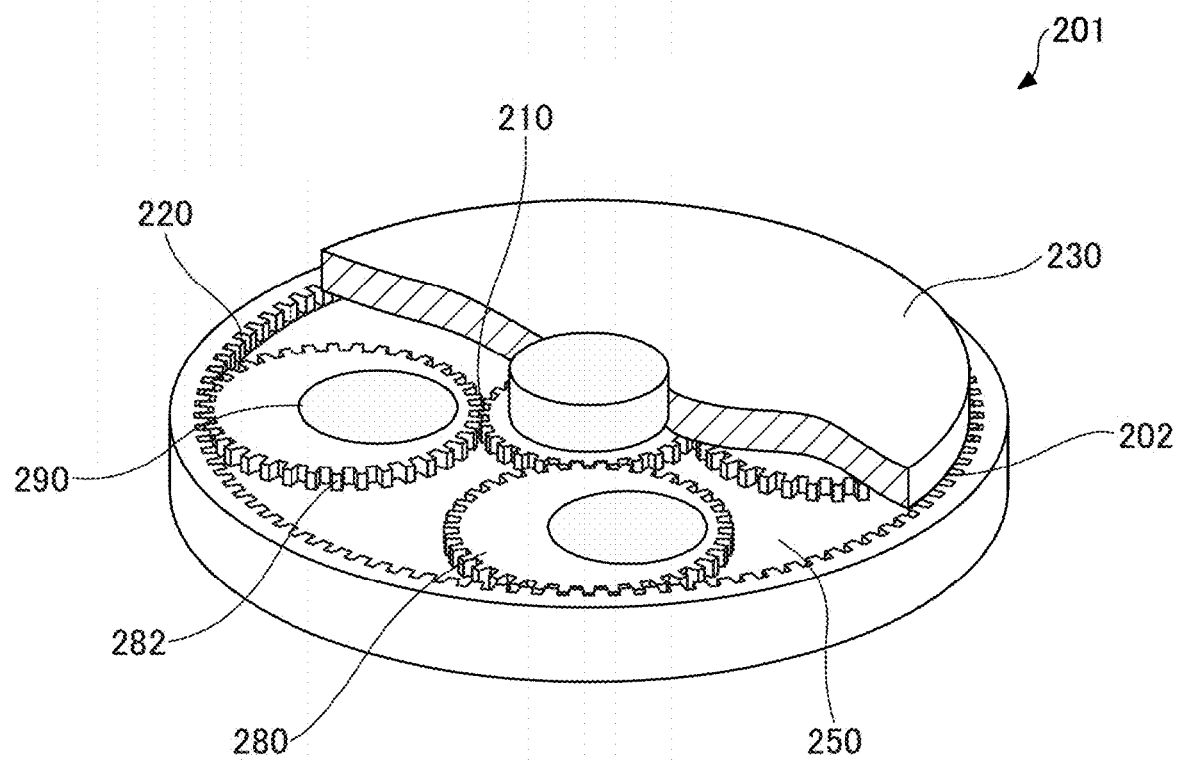
FIG. 5 is a diagram schematically depicting a configuration of a double side polishing apparatus that may be used in implementing the method of producing a glass article according to the embodiment of the present invention.

FIG. 5 schematically illustrates a configuration of a double side polishing apparatus that can be used in implementing the first producing method.

As shown in FIG. 5, a double side polishing apparatus 201 includes a sun gear 210, an internal gear 220, an upper surface plate 230, and a lower surface plate 250. The sun gear 210 and the internal gear 220 are formed such that their respective rotational axes coincide with the center of the double side polishing apparatus 201. The sun gear 210 is disposed at the center of the double side polishing apparatus 201 in a top plan view, and the internal gear 220 is disposed in the outer periphery side of the double side polishing apparatus 201.

The upper surface plate 230 and the lower surface plate 250 are disposed so as to be opposite to each other, and can rotate oppositely or rotate in the same direction. The upper surface plate 230 has a polishing pad (not shown) on the lower surface, i.e., on the side facing the lower surface plate 250. Similarly, the lower surface plate 250 has a polishing pad (not shown) on the upper surface, i.e., on the side facing the upper surface plate 230.

A carrier 280 supporting the glass substrate 290 to be polished is disposed above the lower surface plate 250. In the example of FIG. 5, a plurality of carriers 280 are disposed on the lower surface plate 250. However, this is merely an example, and the number of the carriers 280 disposed on the lower surface plate 250 is not particularly limited.

The carrier 280 has a gear 282 formed in the periphery of the carrier 280 to be engaged with the sun gear 210 and the internal gear 220.

Hereinafter, each process in the first producing method will be described with reference to FIGS. 6 and 7.

(Step S110)

First, the carrier having a circular shape 280 and the glass substrate having a circular shape 290 are prepared. The glass substrate 290 is retained within the carrier 280.

The glass substrate 290 has an upper surface and a lower surface.

The diameter (inner diameter) Lc of the carrier 280 is not particularly limited, and may be in the range of from 110 mm to 600 mm inclusive, for example. However, the diameter Lc is preferably in the range of 1.1 to 2 times the diameter Lg.

The thickness of the glass substrate 290 is not particularly limited, and may be in the range of from 0.1 mm to 2 mm inclusive, for example.

One glass substrate 290 is supported on each carrier 280.

Figure 6:
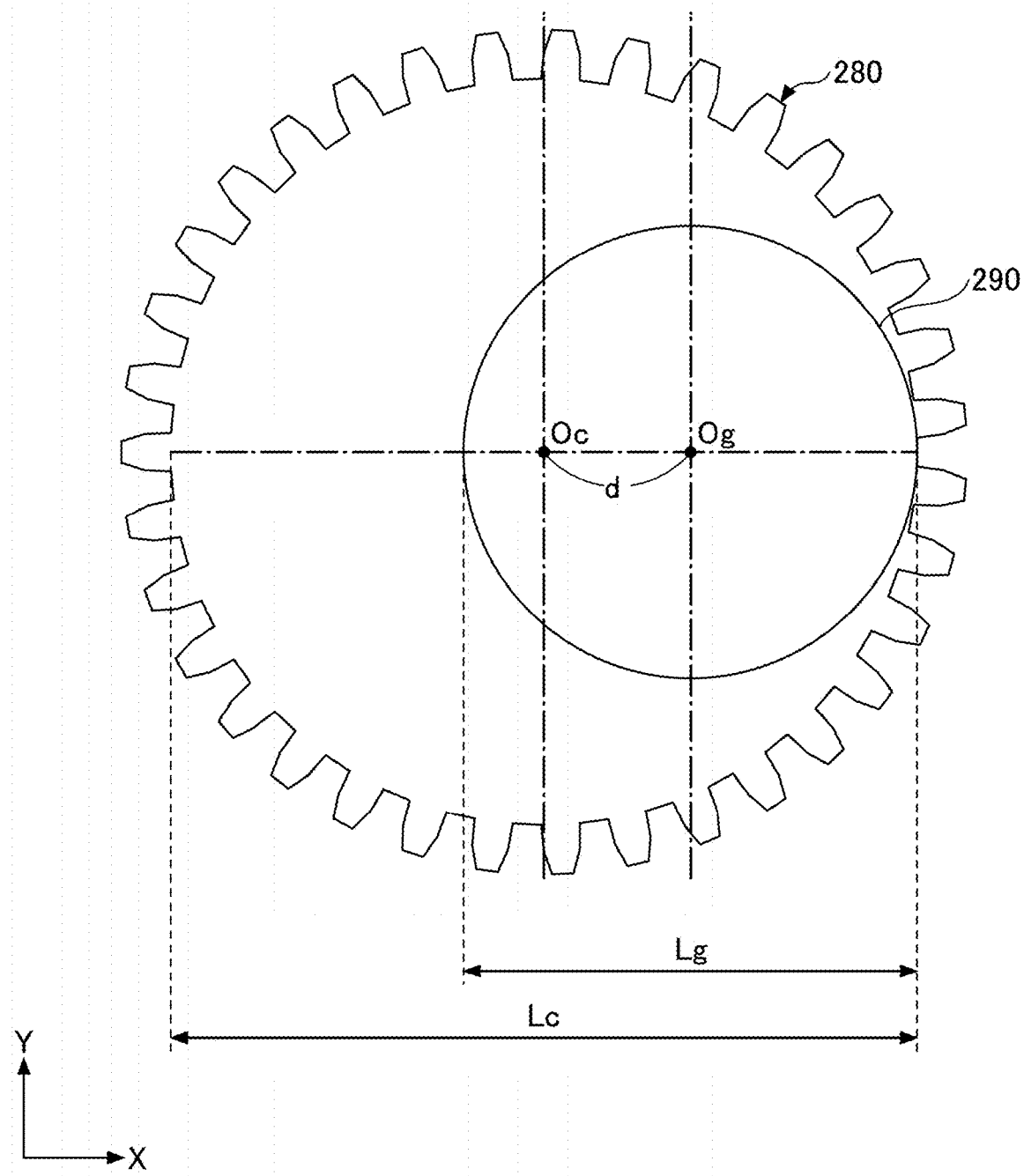
FIG. 6 is a top view schematically depicting an example of an aspect in which a glass substrate is disposed in a carrier.

FIG. 6 is a top view schematically illustrating an example of a mode in which the glass substrate 290 is disposed in the carrier 280.

As shown in FIG. 6, the glass substrate 290 is disposed within the carrier 280, so that the center Oc of the carrier 280 is included in the region of the glass substrate 290, in a top plan view. The glass substrate 290 is also disposed within the carrier 280, so that the center Og of the glass substrate 290 is shifted from the center Oc of the carrier 280, in a top plan view.

The distance d between the center Og of the glass substrate 290 and the center Oc of the carrier 280 ranges, for example, from 0.05×Lg to 0.5×Lg, in a top plan view. The distance d is preferably greater than or equal to 0.1×Lg and less than or equal to 0.25×Lg.

(Step S120)

Next, each carrier 280 is positioned on the lower surface plate 250. The upper surface plate 230 is disposed on each carrier 280, and each carrier 280 is held between the upper surface plate 230 and the lower surface plate 250.

Thus, the upper surface and the lower surface of each glass substrate 290 are brought into contact with the upper surface plate 230 and the lower surface plate 250, respectively. Pressure is applied to the upper surface and the lower surface of each glass substrate 290.

(Step S130)

Then, the sun gear 210 and the internal gear 220 are rotated at a predetermined rotational ratio to rotate the carrier 280 while at the same time revolving the carrier 280 along the internal gear 220 (planetary drive). Additionally, the upper surface plate 230 and the lower surface plate 250 are rotated.

Thus, the upper surface and the lower surface of each glass substrate 290 are polished simultaneously by the upper surface plate 230 and the lower surface plate 250.

During the polishing of each glass substrate 290, a polishing agent may be supplied to the glass substrate 290 from the side of the upper surface plate 230, the side of the lower surface plate 250, or both, as necessary.

By using the above-described double side polishing apparatus 201, the upper and lower surfaces of the glass substrate 290 can be polished simultaneously.

Here, the glass substrate 290 is disposed in a state where the center Og is "eccentric" by the distance d from the center Oc of the carrier 280. In this case, the closer to the center Og of the glass substrate 290, the relatively smaller the amount of polishing.

Hereinafter, the reason for this will be explained with reference to FIG. 7.

As noted above, in the double side polishing apparatus 201, the carrier 280 is revolved along the internal gear 220 while the carrier 280 is rotated. Accordingly, during the polishing process, the glass substrate 290 retained in the carrier 280 moves so as to be revolved around the internal gear 220 while being rotated.

Figure 7:
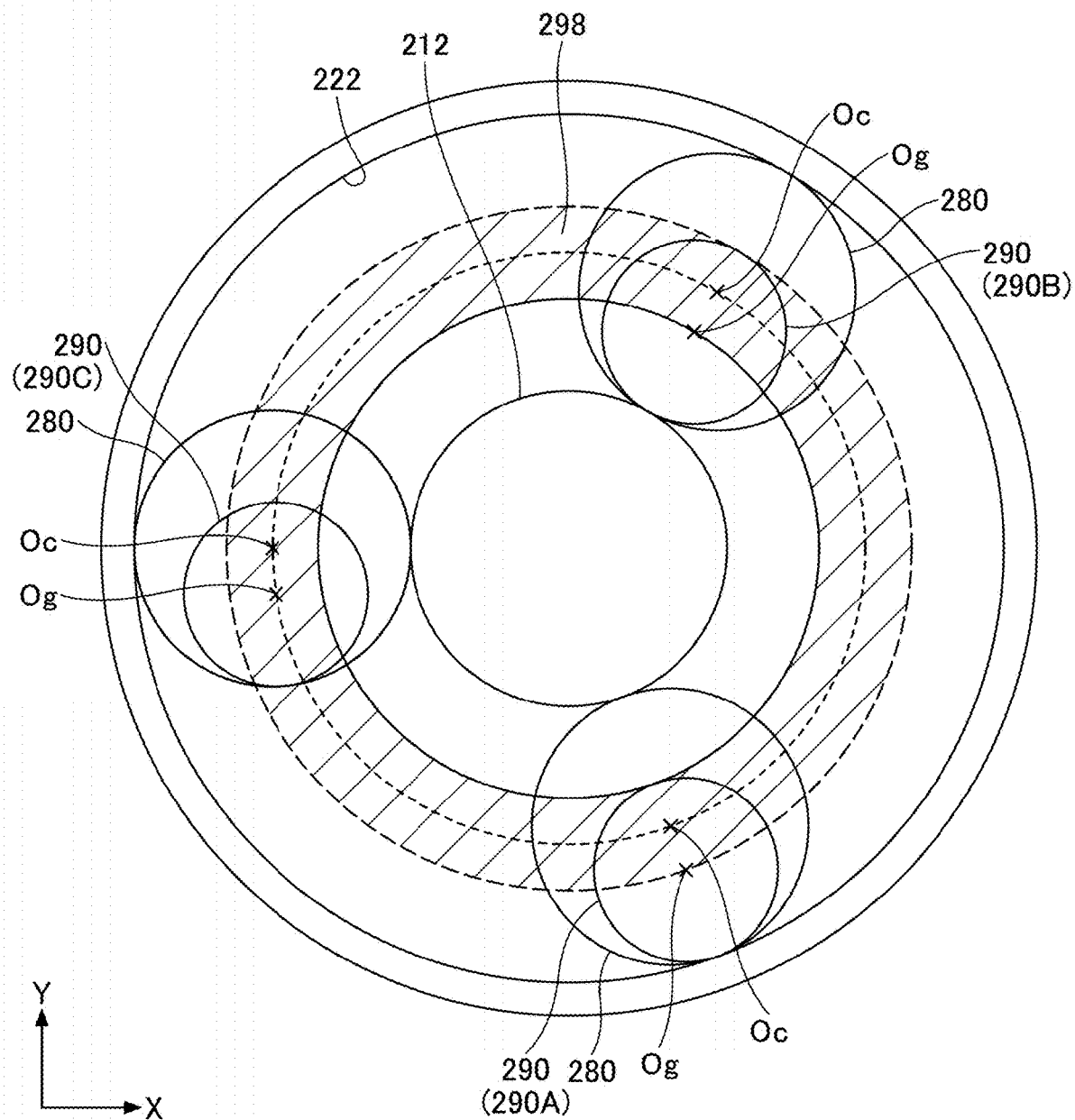
FIG. 7 is a top view schematically illustrating an effect when a center of the glass substrate is shifted from a center of the carrier.

FIG. 7 is a top view schematically showing a state of different positions (290A to 290C) of the glass substrate 290 in operation of the double side polishing apparatus 201 shown in FIG. 5.

For clarification, the upper surface plate 230 is not shown in FIG. 7. Also, in FIG. 7, the sun gear 210 and the internal gear 220 are schematically shown to make clear the positional relationship between the gears and the glass substrate 290.

That is, the sun gear 210 is shown having an outer peripheral end portion 212, which is schematically shown, to make clear the closest position of the glass substrate 290 to the sun gear 210. Similarly, the internal gear 220 is shown having an inner peripheral end portion 222, which is schematically shown, to make clear the closest position of the glass substrate 290 to the internal gear 220.

In other words, the outer peripheral end portion 212 of the sun gear 210 represents a hypothetical limit line where the glass substrate 290 is positioned most inwardly relative to the lower surface plate 250, and the inner peripheral end portion 222 of the internal gear 220 represents a hypothetical limit line for the glass substrate 290 where the glass substrate 290 is positioned most outwardly relative to the lower surface plate 250.

As shown in FIG. 7, the glass substrate 290, which rotates and revolves during the polishing process, can take the following three positional modes with respect to the lower surface plate 250:

(i) outermost position; i.e., a first position where the outer peripheral end portion of the glass substrate 290 is brought into contact with the inner peripheral end portion 222 of the internal gear 220 (the glass substrate 290 at this position is expressed by a "glass substrate 290A");

(ii) innermost position; i.e., a second position where the outer peripheral end portion of the glass substrate 290 is brought into contact with the outer peripheral end portion 212 of the sun gear 210 (the glass substrate 290 at this position is expressed by a "glass substrate 290B"); and (iii) intermediate position; i.e., a third position between (i) and (ii) (the glass substrate 290 at this position is expressed by a "glass substrate 290C").

As a result, the center Og of the glass substrate 290 is disposed only in a shaded region 298 in FIG. 7. The dashed line passing through the center of the region 298 represents the trajectory taken by the center Oc of carrier 280.

Here, since a polishing agent is less likely to be supplied to the central region of the glass substrate 290 than the outer peripheral region, the amount of polishing in the central region of the glass substrate 290 is generally less than that in the outer peripheral region. Accordingly, the closer to the central region including the center Og of the glass substrate 290, the relatively smaller the amount of polishing.

Thus, in the first producing method, the glass article, in which at least one of the upper surface and the lower surface has a "specific convex profile", can be produced relatively easily.

Here, the direction of turning (rotation) of the carrier 280 may be opposite to the direction of rotation of the lower surface plate 250. In this case, the relative rotational speed of the glass substrate 290 relative to the lower surface plate 250 can be increased. Accordingly, the glass article in which the upper surface or the lower surface has a "specific convex profile" can be produced more efficiently.

The glass article produced by the first producing method has a maximum thickness within a range of, for example, from 0.1 mm to 2 mm inclusive. The glass article produced by the first producing method may also have a diameter Lg within a range of from 100 mm to 300 mm inclusive.

(Usage)

The glass articles according to the embodiment of the present invention are used, for example, in optical components. The glass article according to the embodiment of the present invention may be used, for example, as a light guide plate for a head-mounted display.

EXAMPLE

Hereinafter, examples of the present invention will be described.

Example 1

A double side polishing apparatus was used to polish both sides of a glass substrate having a circular shape with a diameter of 150 mm, to produce a glass article.

A carrier having a circular shape with a diameter Lc of 228.6 mm was used for the carrier. The glass substrate was disposed in the carrier with a distance d between the center Og of the glass substrate and the center Oc of the carrier being 25 mm. Therefore, d/Lg≈0.17. Also, the center Oc of the carrier was disposed within the region of the glass substrate in a top plan view.

The pressing pressure by the upper surface plate and the lower surface plate was 40 g/cm² and the polishing time was 40 minutes. The rotational speed of the upper surface plate was set to 8 rpm, and the rotational speed of the lower surface plate was set to 24 rpm. In addition, the rotational speed of the carrier was 8 rpm. The upper surface plate and the carrier were rotated in the direction opposite to the direction of rotation of the lower surface plate.

The thickness of one end portion (first end) of the resulting glass article (hereinafter referred to as "Sample 1") was approximately 325 μm.

Example 2

A glass article was produced in the same manner as Example 1. In Example 2, the distance d was set to 20 mm. Therefore, d/Lg≈0.13. Other conditions were the same as in the case of Example 1. The resulting glass article is referred to as "Sample 2".

Example 3

A glass article was produced in the same manner as Example 1. However, in Example 3, the distance d was set to 10 mm. Therefore, d/Lg≈0.067. Other conditions were the same as in the case of Example 1. The resulting glass article is referred to as "Sample 3".

Example 11

A double side polishing apparatus was used to polish both sides of a glass substrate having a circular shape with a diameter of 150 mm to produce a glass article.

A carrier having a circular shape with a diameter Lc of 406.4 mm was used for the carrier. The glass substrate was disposed in the carrier with the distance d between the center Og of the glass substrate and the center Oc of the carrier being 110 mm. Accordingly, the center Oc of the carrier was disposed at a position outside the region of the glass substrate, in a top plan view.

The pressing pressure by the upper surface plate and the lower surface plate was 40 g/cm² and the polishing time was 60 minutes. The rotational speed of the upper surface plate was set to 6 rpm, and the rotational speed of the lower surface plate was set to 18 rpm. In addition, the rotational speed of the carrier was 6 rpm. The upper surface plate and the carrier were rotated in the direction opposite to the direction of rotation of the lower surface plate.

The thickness of one end portion (the first end) of the resulting glass article was about 325 μm.

The resulting glass article is referred to as "Sample 11".

Example 12

A glass article was produced by the same method as Example 11. However, in Example 12, the polishing time was 90 minutes. Other conditions were the same as in the case of Example 11. The resulting glass article is referred to as "Sample 12".

Example 13

A glass article was prepared by the same method as Example 11. In Example 13, however, the polishing time was set to 150 minutes. Other conditions were the same as in the case for Example 11. The resulting glass article is referred to as "Sample 13".

(Evaluation)

A thickness profile of each sample was measured by optical interferometry type thickness measurement method. A measurement apparatus (FlatMaster 200, by Corning Tropel Corporation) was used for the measurement.

For each sample, the thickness profile measurement was performed over the region from the first end, through the center Og of the sample, to the opposite end portion (referred to as "measurement in the X direction"). The first end is an end portion that was freely selected.

Furthermore, the thickness profile measurement was performed over the region from the third end, which is 90° rotated from the first end around the center Og as a rotation axis, through the center Og of the sample, to the opposite end portion (referred to as "measurement in the Y direction").

Figure 8:
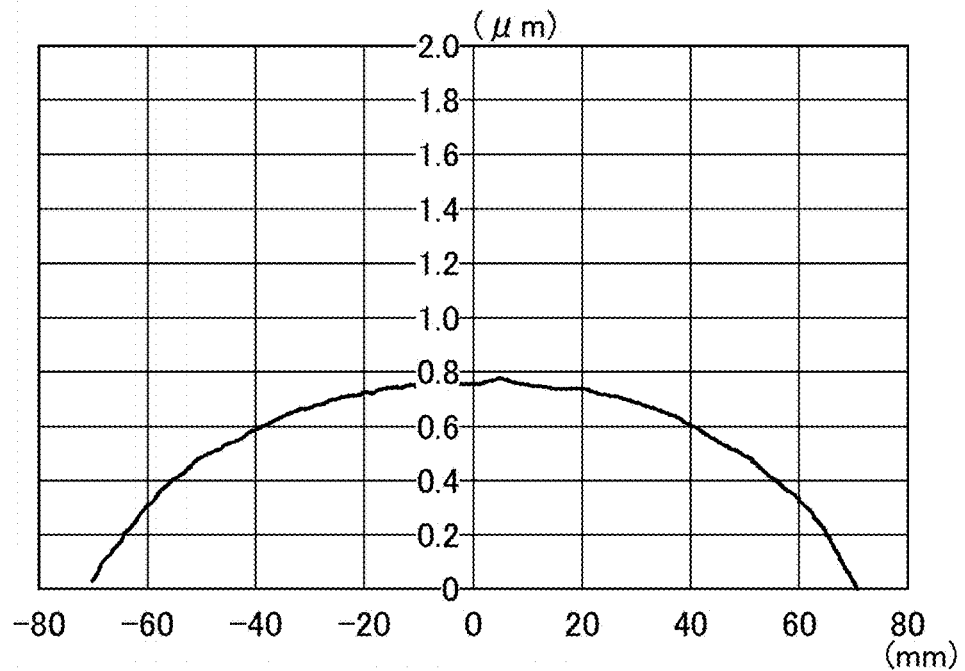
FIG. 8 is a graph showing a result of measurement in an X direction obtained in Sample 1.
Figure 9:
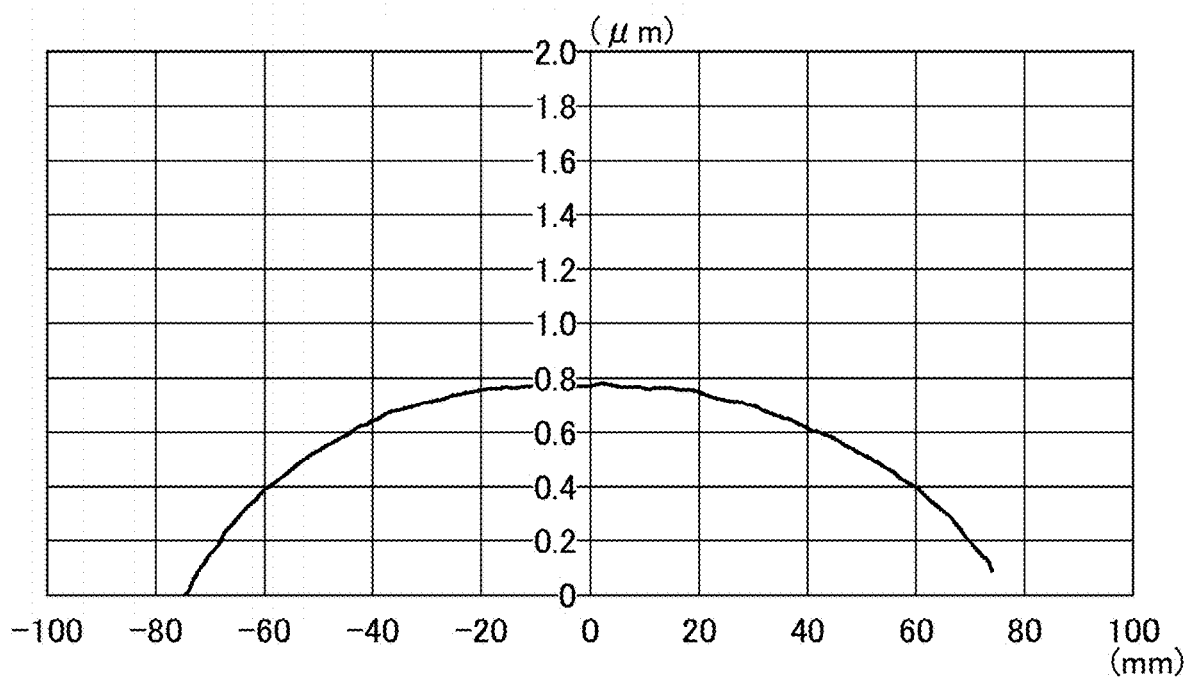
FIG. 9 is a graph showing a result of measurement in a Y direction obtained in Sample 1.
Figure 10:
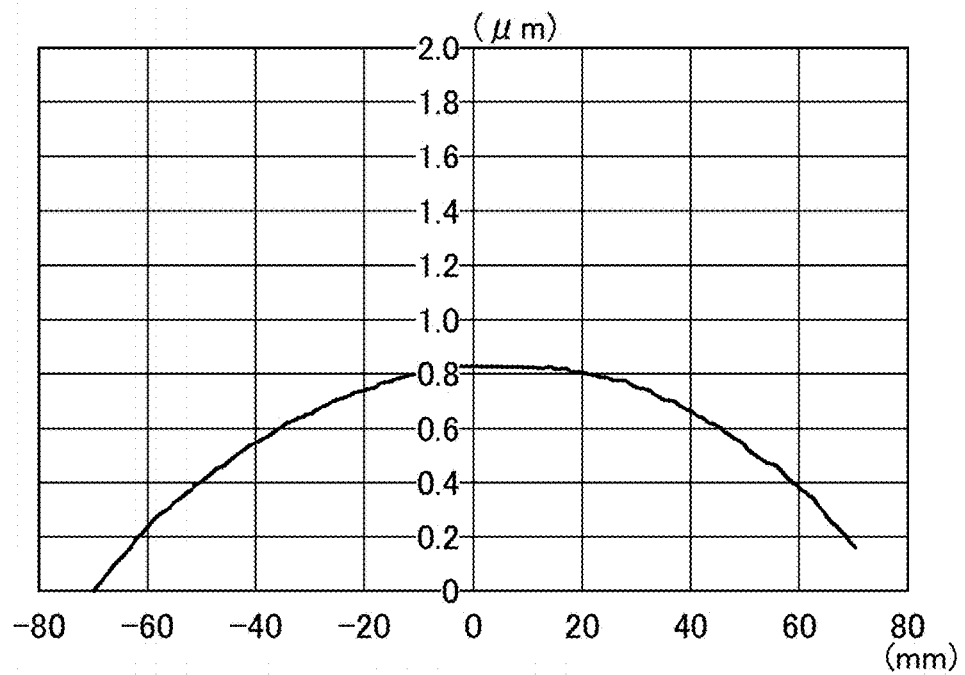
FIG. 10 is a graph showing a result of measurement in the X direction obtained in Sample 2.
Figure 11:
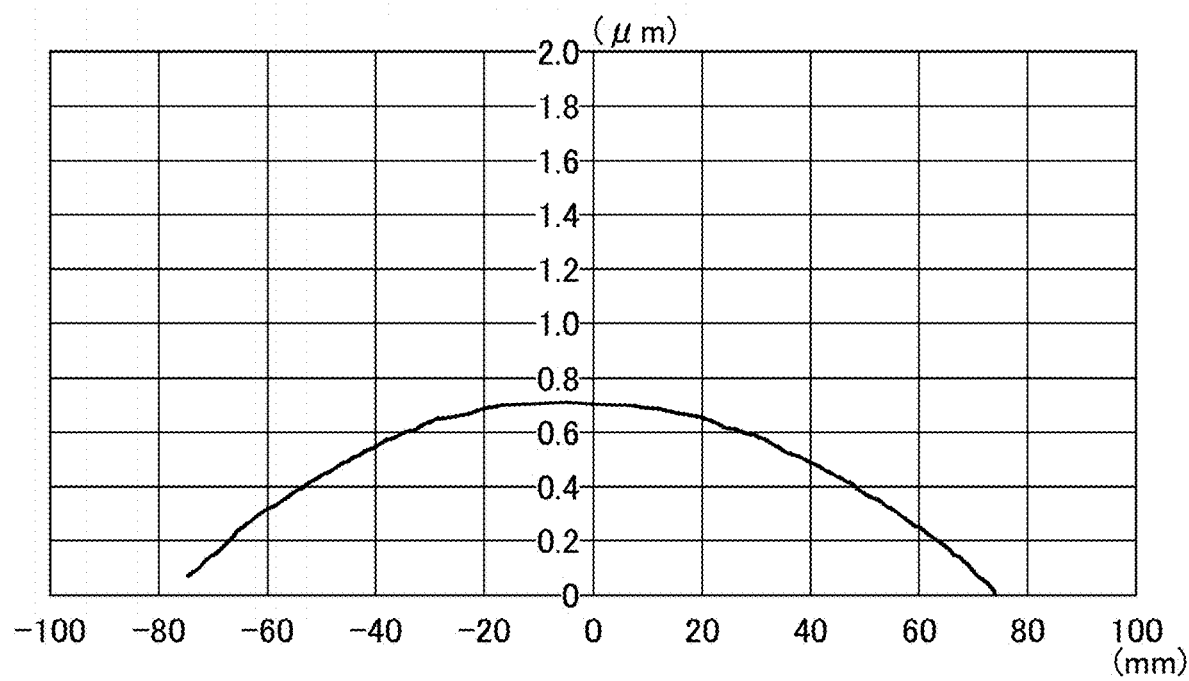
FIG. 11 is a graph showing a result of measurement in the Y direction obtained in Sample 2.
Figure 12:
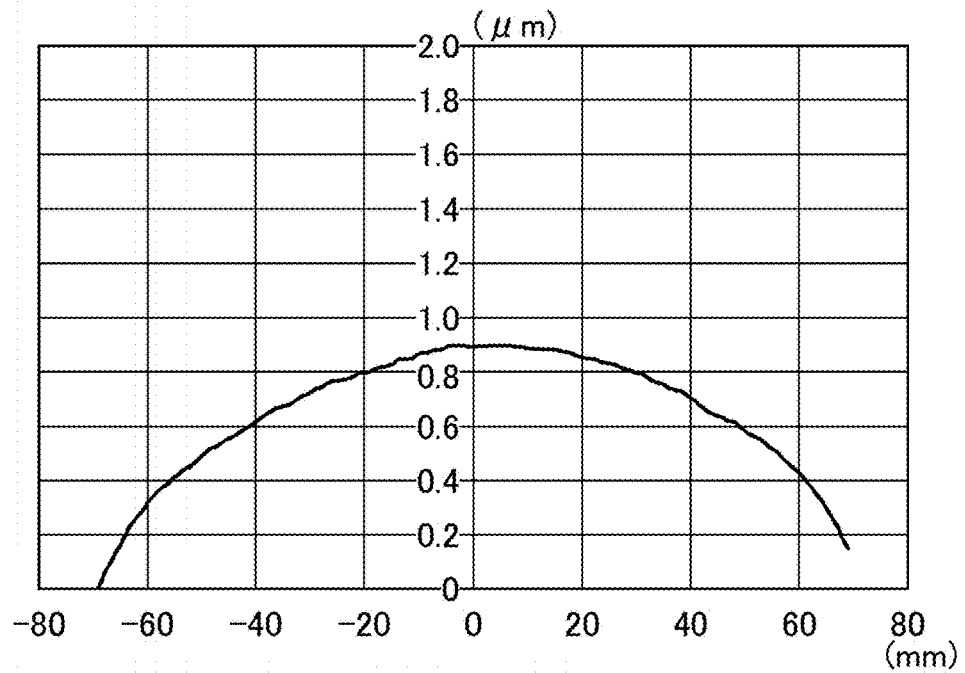
FIG. 12 is a graph showing a result of measurement in the X direction obtained in Sample 3.
Figure 13:
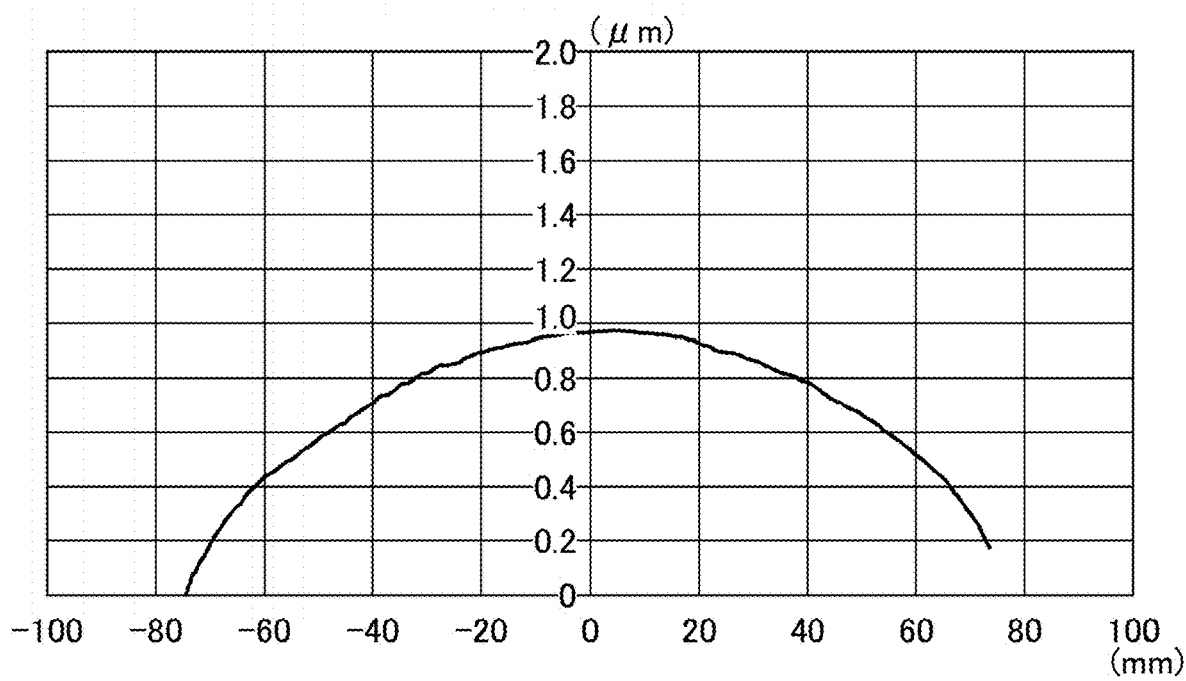
FIG. 13 is a graph showing a result of measurement in the Y direction obtained in Sample 3.
Figure 14:
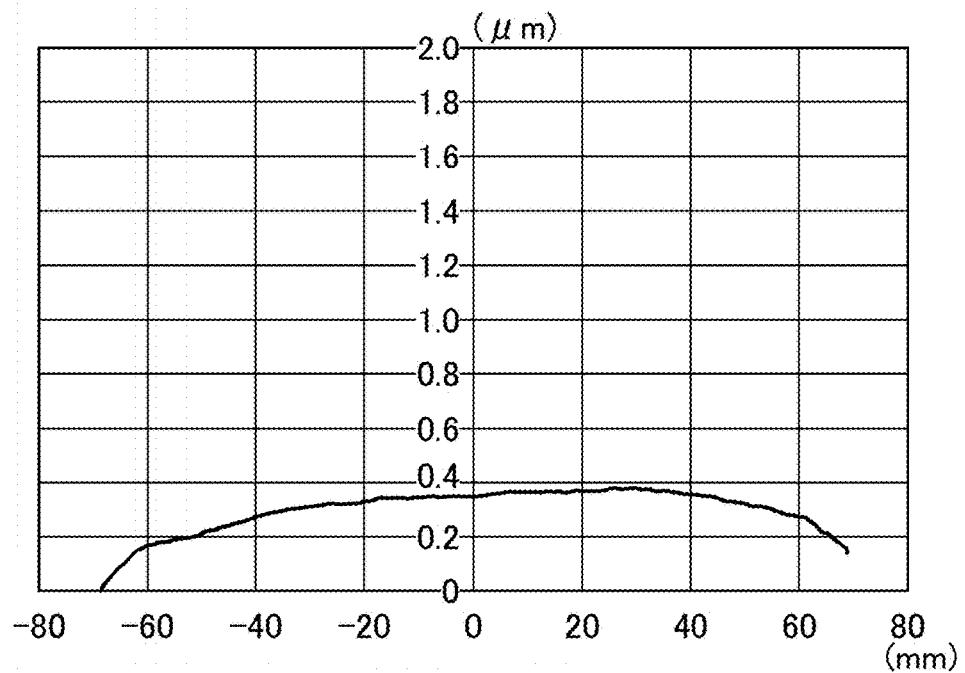
FIG. 14 is a graph showing a result of measurement in the X direction obtained in Sample 11.
Figure 15:
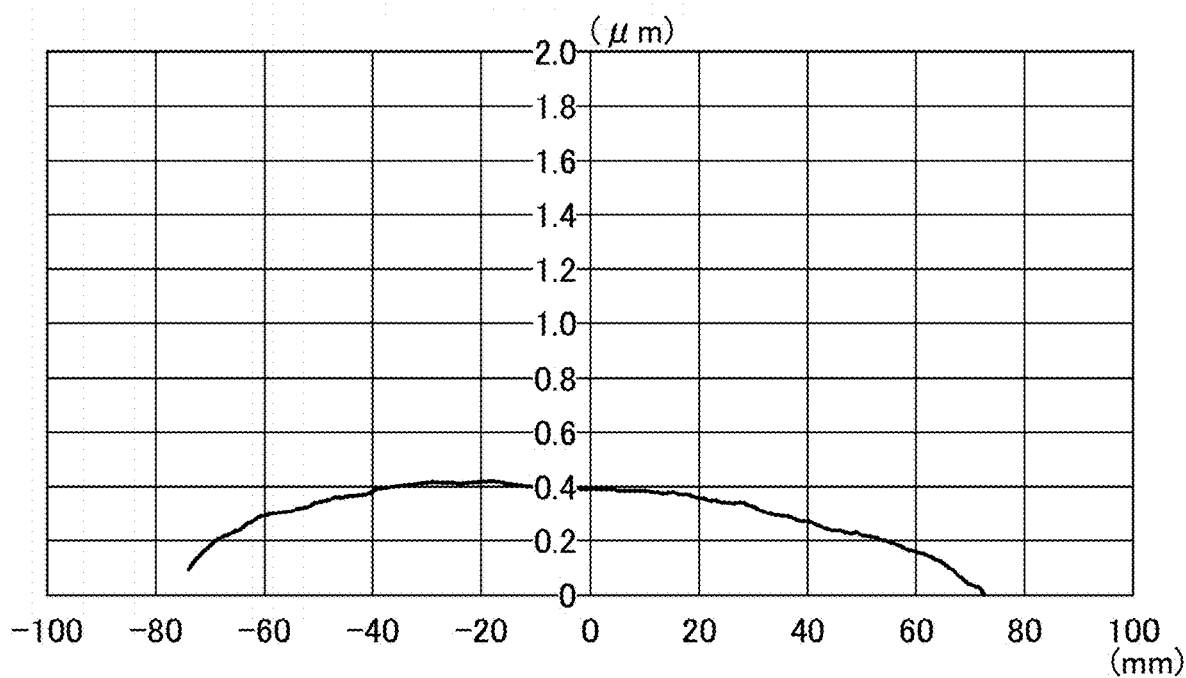
FIG. 15 is a graph showing a result of measurement in the Y direction obtained in Sample 11.
Figure 16:
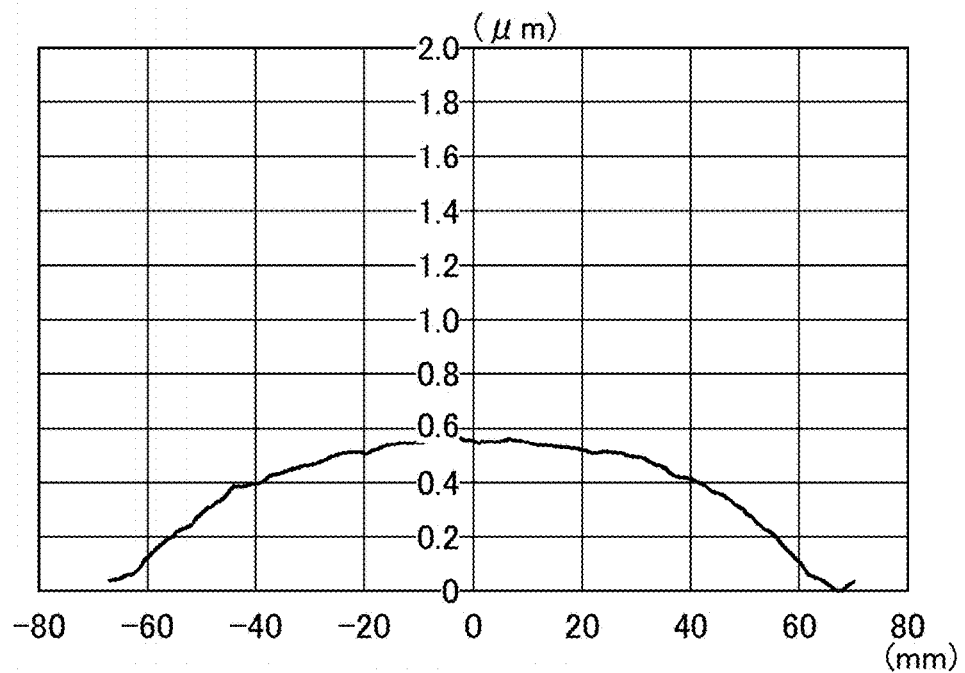
FIG. 16 is a graph showing a result of measurement in the X direction obtained in Sample 12.
Figure 17:
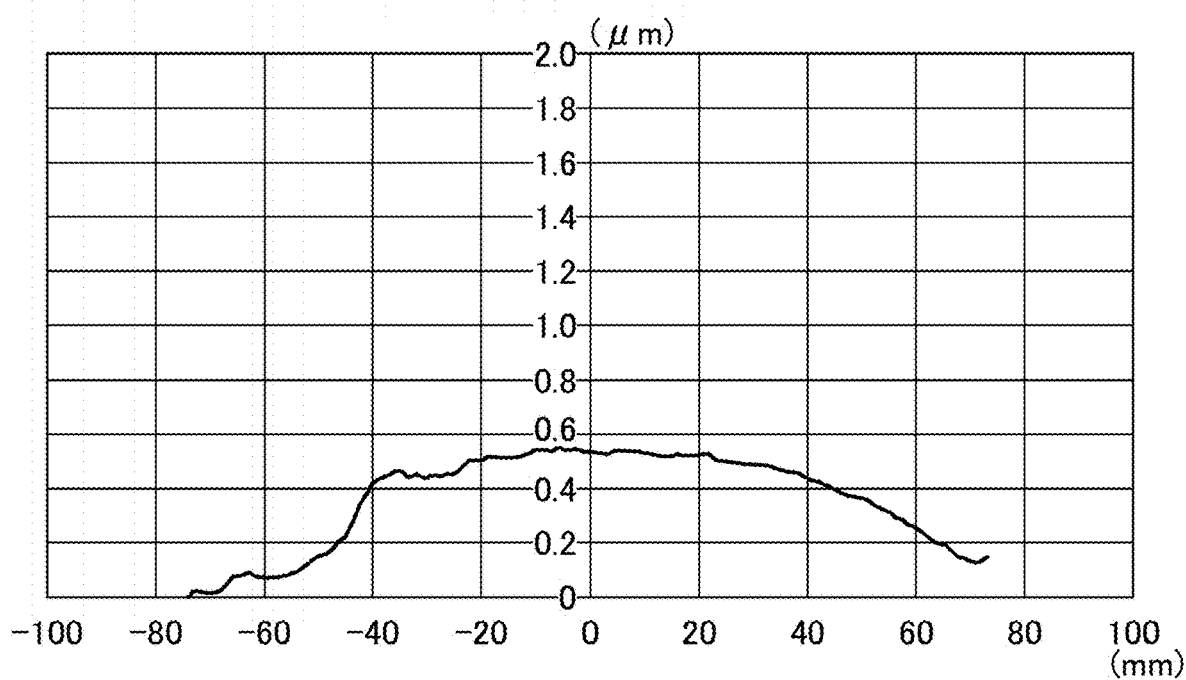
FIG. 17 is a graph showing a result of measurement in the Y direction obtained in Sample 12.
Figure 18:
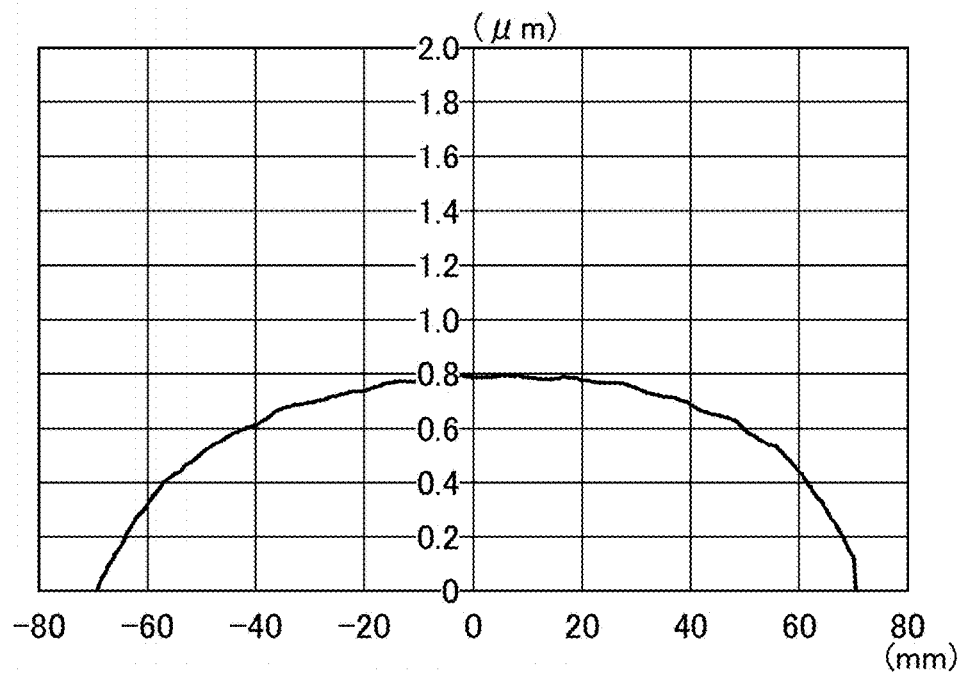
FIG. 18 is a graph showing a result of measurement in the X direction obtained in Sample 13.
Figure 19:
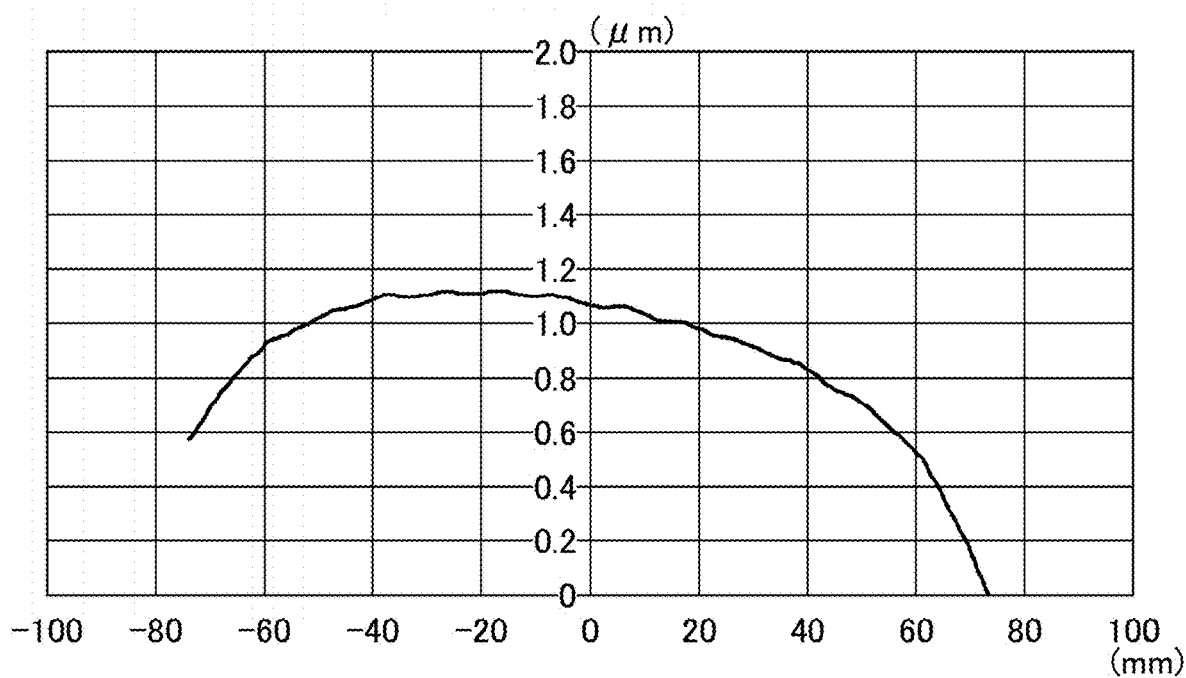
FIG. 19 is a graph showing a result of measurement in the Y direction obtained in Sample 13.

FIGS. 8 and 9 show results of the measurement in the X direction and the measurement in the Y direction obtained for Sample 1, respectively. FIGS. 10 and 11 show results of the measurement in the X direction and the measurement in the Y direction obtained for Sample 2, respectively. FIGS. 12 and 13 show results of the measurement in the X direction and the measurement in the Y direction obtained for Sample 3, respectively. FIGS. 14 and 15 show results of the measurement in the X direction and the measurement in the Y direction obtained for Sample 11, respectively. FIGS. 16 and 17 show results of the measurement in the X direction and the measurement in the Y direction obtained for Sample 12, respectively. In addition, FIGS. 18 and 19 show results of the measurement in the X direction and the measurement in the Y direction obtained for Sample 13, respectively.

In each of these figures, the horizontal axis represents a position (unit: mm) of the sample and the origin O is the center Og of the sample. The vertical axis represents a displacement in height (unit: μm) at each position relative to the minimum plate thickness of the sample.

From these results, in Sample 11 and Sample 13, the central axis of the sample was found to be shifted from the position of the maximum thickness. Also, in Sample 12, it was found that the monotonically decreasing profile from the center to the third end was not obtained, as shown in FIG. 17.

In contrast, in Sample 1 to Sample 3, the central axis of the sample was found to be almost coincident with the position of the maximum thickness, and a monotonically decreasing profile was found to be obtained over the region from the center Og to the end portion in any of the measurement in the X direction and the measurement in the Y direction.

Thus, it was confirmed that, in Sample 1 to Sample 3, the "specific convex profile" was obtained on the surface in any of the "maximum cross-section" in the X direction and the "maximum cross-section" in the Y direction.

As described above, a glass article and a method of producing the glass article in accordance with the present disclosure have been described. However, the present invention is not limited to the above-described embodiment. Various variations, modifications, replacements, additions, deletions, and combinations may be made without departing from the scope recited in claims. They are of course within the technical scope of the present disclosure.

What is claimed is:

1. A method of producing a glass article comprising:
holding a carrier having a circular shape, in which a glass substrate having a circular shape is retained, with an upper surface plate and a lower surface plate; and
polishing the glass substrate by rotating the carrier with respect to the upper surface plate and the lower surface plate, to obtain the glass article, wherein:
the glass substrate is disposed in the carrier such that, in a top plan view,
 a center Oc of the carrier is included in a region of the glass substrate, and
 a center Og of the glass substrate is shifted from the center Oc of the carrier,
wherein the glass article comprises a first surface having a circular shape wherein:
 a radius R of the glass article is within a range of from 50 mm to 150 mm inclusive,
 when, in the glass article, to is a thickness at the center Og, a first end is one end portion, t1 is a thickness at the first end, tx' is a thickness at any position X, except the first end and the center Og, between the first end and the center Og, and
 a thickness is measured from a first-surface side of the glass article by an optical interferometry type thickness measurement method, conditions of $$0.1 \text{ mm} < to < 2 \text{ mm} \qquad \text{expression (1)},$$

$$1 < to/t1 \leq 1.1 \qquad \text{expression (2)},$$

$$to > tx' > t1 \qquad \text{expression (3), and}$$

$$tx_n \geq (to - t1) \times (n/5) + t1 \qquad \text{expression (4)}$$

are satisfied, where n is any integer from 1 to 5, and txn represents a thickness at a position $X_n$ of $R \times (n/5)$ from the first end toward the center Og, and wherein when a second end is an end portion opposite to the first end with respect to the center Og, t2 is a thickness at the second end, tx" is a thickness at any position W, except the second end and the center Og, between the second end and the center Og, and a thickness is measured from a first-surface side of the glass article by the optical interferometry type thickness measurement method, conditions of $1 < to/t2 \leq 1.1$      expression (5), $to > tx" > t2$      expression (6), and $tw_n \geq (to-t2) \times (n/5) + t2$      expression (7)

are satisfied, where n is any integer from 1 to 5, and twn represents a thickness at a position $W_n$ of $R \times (n/5)$ from the second end toward the center Og, wherein:
the glass article has a thickness that monotonically decreases from the center Og toward each of the end portions,
the glass article comprises glass having a refractive index of 1.6 or more, and
the glass article comprises glass having a surface roughness of 0.5 nm or less.

2. The method of producing a glass article according to claim 1, wherein:
where Lg is a diameter of the glass substrate, a distance d between the center Oc and the center Og, in a top plan view, satisfies a condition of $0.05 \times Lg \leq d \leq 0.5 \times Lg$.

3. The method of producing a glass article according to claim 2, wherein the distance d is greater than or equal to $0.1 \times Lg$.

4. The method of producing a glass article according to claim 2, wherein the distance d is less than or equal to $0.25 \times Lg$.

5. The method of producing a glass article according to claim 1, wherein:
when a third end is an end portion at a position rotated 90° from the first end around the center Og as a center, t3 is a thickness at the third end, ty' is a thickness at any position Y, except the third end and the center Og, between the third end and the center Og, and
a thickness is measured from a first-surface side of the glass article by the optical interferometry type thickness measurement method, conditions of $1 < to/t3 \leq 1.1$      expression (8), $to > ty' > t3$      expression (9), and $ty_n \geq (to-t3) \times (n/5) + t3$      expression (10)

are satisfied, where n is any integer from 1 to 5, and tyn represents a thickness at a position $Y_n$ of $R \times (n/5)$ from the third end toward the center Og, and wherein
when a fourth end is an end portion opposite to the third end with respect to the center Og, t4 is a thickness at the fourth end, ty" is a thickness at any position V, except the fourth end and the center Og, between the fourth end and the center Og, and a thickness is measured from a first-surface side of the glass article by the optical interferometry type thickness measurement method, conditions of $1 < to/t4 \leq 1.1$      expression (11), $to > ty" > t4$      expression (12), and $tv_n \geq (to-t4) \times (n/5) + t4$      expression (13)

are satisfied, where n is any integer from 1 to 5, and tvn represents a thickness at a position $V_n$ of $R \times (n/5)$ from the fourth end toward the center Og, and
the glass article has a maximum thickness within a range of from 0.1 mm to 2 mm, inclusive.

6. The method of producing a glass article according to claim 1, wherein:
when a third end is an end portion at a position rotated 90° from the first end around the center Og as a center, t3 is a thickness at the third end, ty' is a thickness at any position Y, except the third end and the center Og, between the third end and the center Og, and
a thickness is measured from a first-surface side of the glass article by the optical interferometry type thickness measurement method, conditions of $1 < to/t3 \leq 1.1$      expression (8), $to > ty' > t3$      expression (9), and $ty_n \geq (to-t3) \times (n/5) + t3$      expression (10)

are satisfied, where n is any integer from 1 to 5, and tyn represents a thickness at a position $Y_n$ of $R \times (n/5)$ from the third end toward the center Og, and wherein when a fourth end is an end portion opposite to the third end with respect to the center Og, t4 is a thickness at the fourth end, ty" is a thickness at any position V, except the fourth end and the center Og, between the fourth end and the center Og, and
a thickness is measured from a first-surface side of the glass article by the optical interferometry type thickness measurement method, conditions of $1 < to/t4 \leq 1.1$      expression (11), $to > ty" > t4$      expression (12), and $tv_n \geq (to-t4) \times (n/5) + t4$      expression (13)

are satisfied, where n is any integer from 1 to 5, and $tv_n$ represents a thickness at a position $V_n$ of $R \times (n/5)$ from the fourth end toward the center Og, and
the glass article has a maximum thickness within a range of from 50 mm to 150 mm, inclusive.

* * * * *